US011360475B2

(12) United States Patent
Abrams et al.

(10) Patent No.: US 11,360,475 B2
(45) Date of Patent: Jun. 14, 2022

(54) REAL-TIME LANE CHANGE SELECTION FOR AUTONOMOUS VEHICLES

(71) Applicant: Waymo LLC, Mountain View, CA (US)

(72) Inventors: Austin Daniel Abrams, Los Altos, CA (US); Guillaume Dupre, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 313 days.

(21) Appl. No.: 15/831,678

(22) Filed: Dec. 5, 2017

(65) Prior Publication Data

US 2019/0171206 A1 Jun. 6, 2019

(51) Int. Cl.
*G05D 1/00* (2006.01)
*G05D 1/02* (2020.01)
(Continued)

(52) U.S. Cl.
CPC .......... *G05D 1/0088* (2013.01); *B60W 40/02* (2013.01); *G01C 21/34* (2013.01); *G05D 1/0274* (2013.01); *G05D 2201/0213* (2013.01)

(58) Field of Classification Search
CPC ......... G05D 1/0088; G05D 2201/0213; G05D 1/0274; G05D 1/0212; G05D 1/2074; G01C 21/34; G01C 21/3461; G01C 21/3658; B60W 40/02; B60W 30/18163; B60W 2556/40; B60W 30/18154; B60W 60/0011; B60W 2556/50; B60W 2554/00; B60W 30/14; G06V 20/588
See application file for complete search history.

(56) References Cited

U.S. PATENT DOCUMENTS 6,385,539 B1 * 5/2002 Wilson ................... G01C 21/30
701/468
7,805,442 B1 * 9/2010 Joshi ...................... G01C 21/32
707/736
(Continued)

FOREIGN PATENT DOCUMENTS

EP 3342666 A1 7/2018
JP 2006105686 A 4/2006
(Continued)

OTHER PUBLICATIONS

International Search Report and Written Opinion for Application No. PCT/US2018/059225 dated Feb. 28, 2019.
(Continued)

*Primary Examiner* — Bhavesh V Amin
(74) *Attorney, Agent, or Firm* — Botos Churchill IP Law

(57) ABSTRACT

Aspects of the disclosure relate to routing an autonomous vehicle. For instance, the vehicle may be maneuvered along a route in a first lane using map information identifying a first plurality of nodes representing locations within the first lane and a second plurality of nodes representing locations within a second lane different from the first lane. While maneuvering, when the vehicle should make a lane change may be determined by assessing a cost of connecting a first node of the first plurality of nodes with a second node of a second plurality of nodes. The assessment may be used to make the lane change from the first lane to the second lane.

22 Claims, 12 Drawing Sheets

(51) Int. Cl.
*B60W 40/02* (2006.01)
*G01C 21/34* (2006.01)

(56) References Cited

U.S. PATENT DOCUMENTS

| | | | |
|---|---|---|---|
| 7,930,095 B2* | 4/2011 | Lee | G01C 21/3632 |
| | | | 701/119 |
| 8,335,641 B2* | 12/2012 | Nakayama | G08G 1/096827 |
| | | | 701/408 |
| 9,096,267 B2* | 8/2015 | Mudalige | B62D 15/0255 |
| 9,146,127 B2* | 9/2015 | Bank | G01C 21/3617 |
| 9,404,761 B2* | 8/2016 | Meuleau | G01C 21/3453 |
| 9,405,293 B2* | 8/2016 | Meuleau | G01C 21/34 |
| 9,428,187 B2 | 8/2016 | Lee | |
| 9,623,905 B2* | 4/2017 | Shashua | G01C 21/3691 |
| 9,656,673 B2* | 5/2017 | Clarke | B60W 10/18 |
| 9,792,508 B2* | 10/2017 | Kawasaki | G06K 9/00798 |
| 9,892,296 B2* | 2/2018 | Kovarik | G06K 7/10376 |
| 9,964,414 B2* | 5/2018 | Slavin | G08G 1/0129 |
| 10,078,770 B2* | 9/2018 | Kovarik | G05D 1/0261 |
| 10,126,136 B2* | 11/2018 | Iagnemma | G05D 1/0088 |
| 10,156,845 B1* | 12/2018 | Greenberger | G08G 1/096725 |
| 10,309,792 B2* | 6/2019 | Iagnemma | G05D 1/0214 |
| 10,331,129 B2* | 6/2019 | Iagnemma | B62D 15/0285 |
| 10,431,095 B2* | 10/2019 | Jain | B60W 30/10 |
| 10,473,470 B2* | 11/2019 | Iagnemma | G01C 21/30 |
| 10,681,513 B2* | 6/2020 | Iagnemma | H04W 4/70 |
| 10,696,299 B2* | 6/2020 | Weldemariam | B60W 30/0956 |
| 10,800,416 B2* | 10/2020 | Aine | B60W 10/18 |
| 10,857,994 B2* | 12/2020 | Iagnemma | G01C 21/3407 |
| 10,867,139 B2* | 12/2020 | Kovarik | E01F 9/30 |
| 11,092,446 B2* | 8/2021 | Iagnemma | G01C 21/3461 |
| 11,097,735 B1* | 8/2021 | Marasigan | B60W 30/18163 |
| 2007/0106470 A1* | 5/2007 | Nakayama | G01C 21/3629 |
| | | | 701/437 |
| 2011/0169958 A1* | 7/2011 | Imai | G01C 21/3658 |
| | | | 348/149 |
| 2013/0103258 A1* | 4/2013 | Evaldsson | B60W 30/14 |
| | | | 701/36 |
| 2013/0275033 A1* | 10/2013 | Bastiaensen | G01C 21/26 |
| | | | 701/119 |
| 2013/0282264 A1* | 10/2013 | Bastiaensen | G08G 1/0129 |
| | | | 701/119 |
| 2014/0025201 A1* | 1/2014 | Ryu | G05D 1/0217 |
| | | | 700/245 |
| 2014/0032017 A1* | 1/2014 | Anderson | G05D 1/00 |
| | | | 701/3 |
| 2014/0207325 A1* | 7/2014 | Mudalige | G05D 1/0212 |
| | | | 701/26 |
| 2014/0278052 A1* | 9/2014 | Slavin | G08G 1/0129 |
| | | | 701/400 |
| 2015/0142207 A1 | 5/2015 | Flehmig et al. | |
| 2015/0241232 A1 | 8/2015 | Park et al. | |
| 2015/0345966 A1* | 12/2015 | Meuleau | G01C 21/3453 |
| | | | 701/23 |
| 2015/0345967 A1 | 12/2015 | Meuleau | |
| 2015/0353082 A1* | 12/2015 | Lee | B60W 30/10 |
| | | | 701/41 |
| 2015/0353085 A1* | 12/2015 | Lee | B60W 30/12 |
| | | | 701/533 |
| 2016/0098496 A1* | 4/2016 | Joshi | G01C 21/3867 |
| | | | 703/1 |
| 2017/0021864 A1 | 1/2017 | Sonntag et al. | |
| 2017/0031361 A1 | 2/2017 | Olson et al. | |
| 2017/0043780 A1* | 2/2017 | Yoon | B60W 10/04 |
| 2017/0192436 A1 | 7/2017 | Min et al. | |
| 2017/0213466 A1* | 7/2017 | Azar | G05D 1/0088 |
| 2017/0227966 A1* | 8/2017 | Monzen | B62D 15/0255 |
| 2017/0320521 A1 | 11/2017 | Fujita | |
| 2018/0292824 A1* | 10/2018 | Kazemi | G08G 1/0129 |
| 2019/0086226 A1 | 3/2019 | Hamada et al. | |
| 2019/0310627 A1* | 10/2019 | Halder | B60W 50/14 |

FOREIGN PATENT DOCUMENTS

| | | |
|---|---|---|
| JP | 2015152386 A | 8/2015 |
| JP | 2016017914 A | 2/2016 |
| JP | 2016075905 A | 5/2016 |
| JP | 2017090301 A | 5/2017 |
| JP | 2017142145 A | 8/2017 |
| KR | 101252015 B1 | 4/2013 |
| KR | 20150058030 A | 5/2015 |
| WO | 2017168662 A1 | 10/2017 |

OTHER PUBLICATIONS

Notice of Reasons for Rejection for Japanese Patent Application No. 2020-529291, dated Sep. 3, 3021.
The Extended European Search Report for European Patent Application No. 18885764.3, dated Jul. 9, 2021.
Notice of Preliminary Rejection for Korean Patent Application No. 10-2020-7015985, dated Nov. 1, 2021.
Decision of Rejection for Japanese Patent Application No. 2020-529291, dated Apr. 11, 2022.

* cited by examiner

REAL-TIME LANE CHANGE SELECTION FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require one or more lane changes.

BRIEF SUMMARY

One aspect of the disclosure provide a method of routing an autonomous vehicle. The method includes maneuvering the vehicle along a route in a first lane using map information identifying a first plurality of nodes representing locations within a first lane and a second plurality of nodes representing locations within a second lane different from the first lane; while maneuvering, determining when the vehicle should make a lane change to follow the route by assessing a cost of connecting a first node of the first plurality of nodes with a second node of a second plurality of nodes; and using the assessment to make the lane change from the first lane to the second lane.

In one example, assessing a cost includes applying a cost function. In one example, the cost function is based on a duration of the change from the location represented by the first node and the location represented by the second node. In addition or alternatively, the cost function is based on current traffic conditions. In addition or alternatively, the cost function is based on whether the change has been missed previously, the cost function is based on whether the vehicle will cross a solid white line. In addition or alternatively, the cost function is based on whether the vehicle will be making the change in an intersection. In addition or alternatively, the cost function is based on a time of day the change will occur. In another example, the method also includes, when the vehicle is unable to make the change, increasing a cost for changing lanes between the location represented by first node and the location represented by second node. In another example, the method also includes iterating through pairs of nodes of the first and second pluralities of nodes to determine where to make the change.

Another aspect of the disclosure provides a system for routing an autonomous vehicle. The system includes one or more processors configured to maneuver the vehicle along a route in a first lane using map information identifying a first plurality of nodes representing locations within a first lane and a second plurality of nodes representing locations within a second lane different from the first lane; while maneuvering, determine when the vehicle should make a lane change to follow the route by assessing a cost of connecting a first node of the first plurality of nodes with a second node of a second plurality of nodes; and use the assessment to make the lane change from the first lane to the second lane.

In one example, assessing a cost includes applying a cost function. In one example, the cost function is based on a duration of the change from the location represented by the first node and the location represented by the second node. In addition or alternatively, the cost function is based on current traffic conditions. In addition or alternatively, the cost function is based on whether the change has been missed previously, the cost function is based on whether the vehicle will cross a solid white line. In addition or alternatively, the cost function is based on whether the vehicle will be making the change in an intersection. In addition or alternatively, the cost function is based on a time of day the change will occur. In another example, the one or more processors are also configured to, when the vehicle is unable to make the change, increase a cost for changing lanes between the location represented by first node and the location represented by second node. In another example, the one or more processors are also configured to iterate through pairs of nodes of the first and second pluralities of nodes to determine where to make the change. In another example, the system also includes memory storing the map information. In another example, the system also includes the vehicle.

DETAILED DESCRIPTION

Overview

The technology relates to determining when to change lanes while a vehicle, such as an autonomous vehicle or a vehicle having an autonomous driving mode, is traveling along a route. In some instances, the vehicle's computing devices may rely on a plurality of nodes interconnected to one another as a map or roadgraph in order to determine how to route the vehicle through the vehicle's environment. As such, lane changes effectively cause the vehicle to pass from one set of nodes for one lane to another set of nodes for a different lane. To determine which individual nodes of the different sets to use when transitioning, a cost analysis may be used.

This cost analysis may include, for instance, determining a series of individual costs for different factors relating to transitioning between two nodes and using these individual costs to determine an overall cost for a transition between the two nodes. To determine the individual costs, each factor may be converted to an arbitrary value for a particular transition between two nodes.

The values for each of the individual costs may then be used to determine an overall cost for the transition between the two nodes. The computing devices may then iterate through pairs of nodes corresponding to different possible transitions or lane changes and identify overall costs for each pair of nodes. After iterating through pairs of nodes corresponding to different possible transitions, the computing devices may select a particular pair of nodes. For instance, a pair of nodes having the lowest overall cost of all of the pairs of nodes may be selected. This selected pair may then be used by the vehicle's computing devices to determine how to maneuverer the vehicle in order to change lanes. The vehicle may then be controlled in order to complete the lane change.

The features described herein allow autonomous vehicles or vehicles operating in an autonomous driving mode to identify the best location at which to make a lane change in real time. In addition, this prevents the vehicle from being stuck in an infinite loop and unable to execute a lane change.

Example Systems

Figure 1:
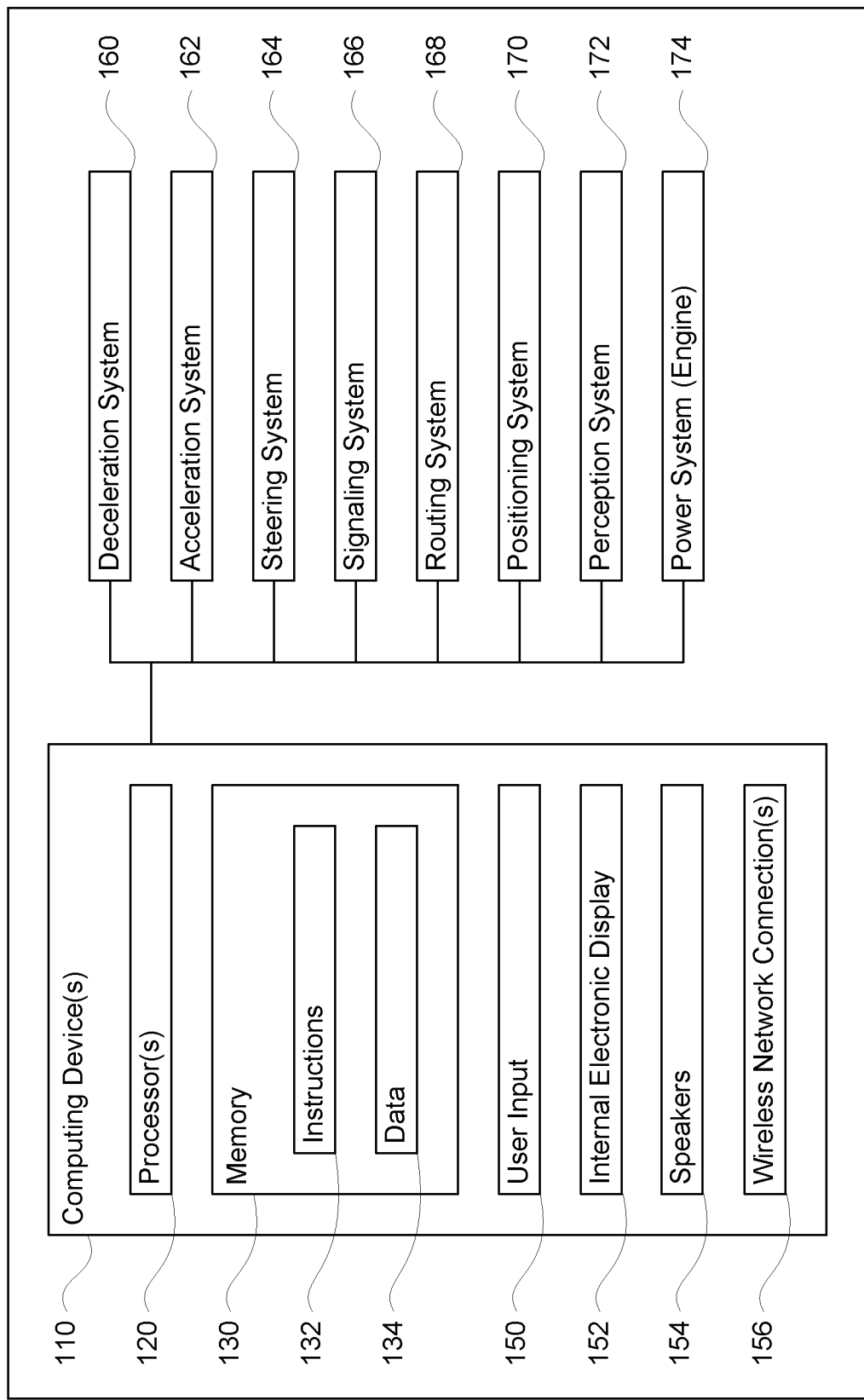
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2A:
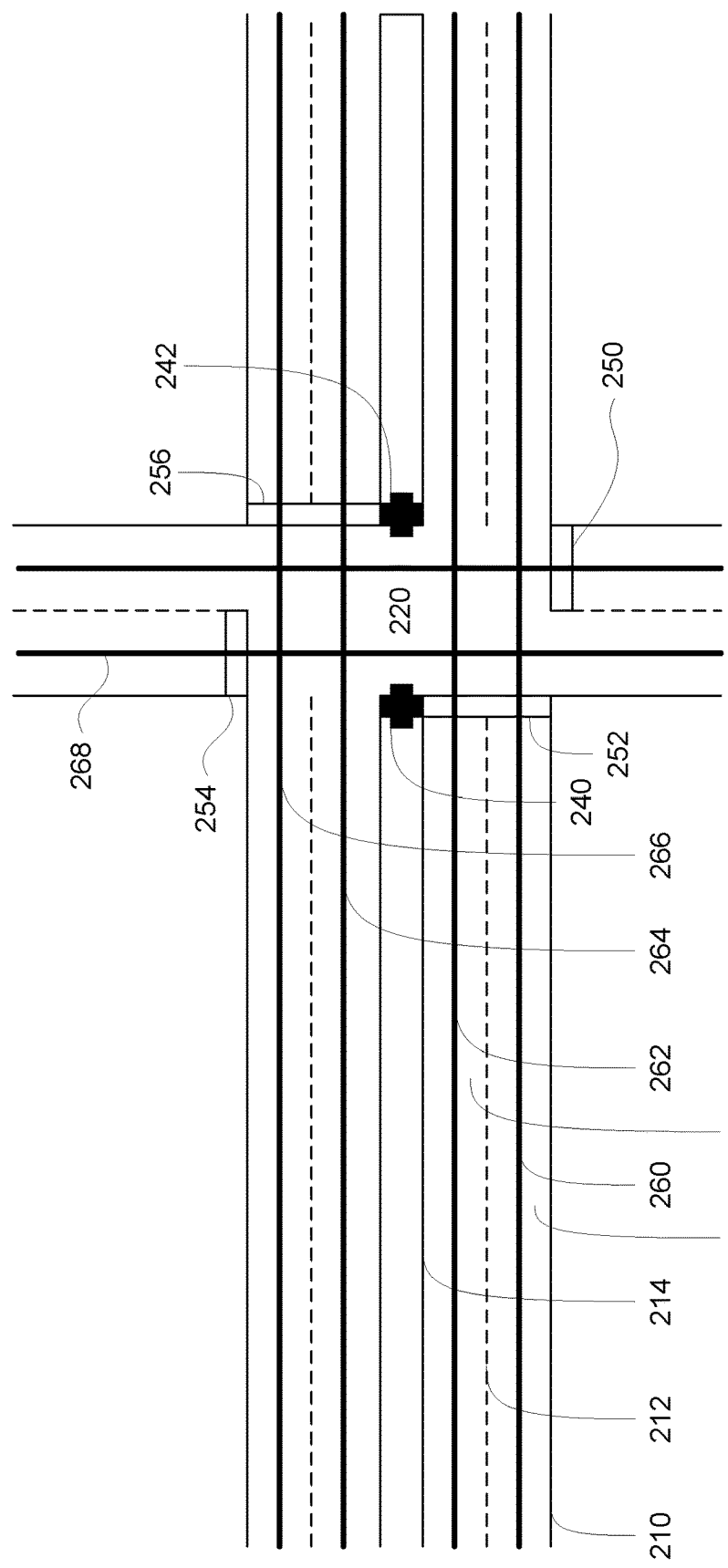
FIGS. 2A and 2B are an example of map information in accordance with aspects of the disclosure.
Figure 2B:
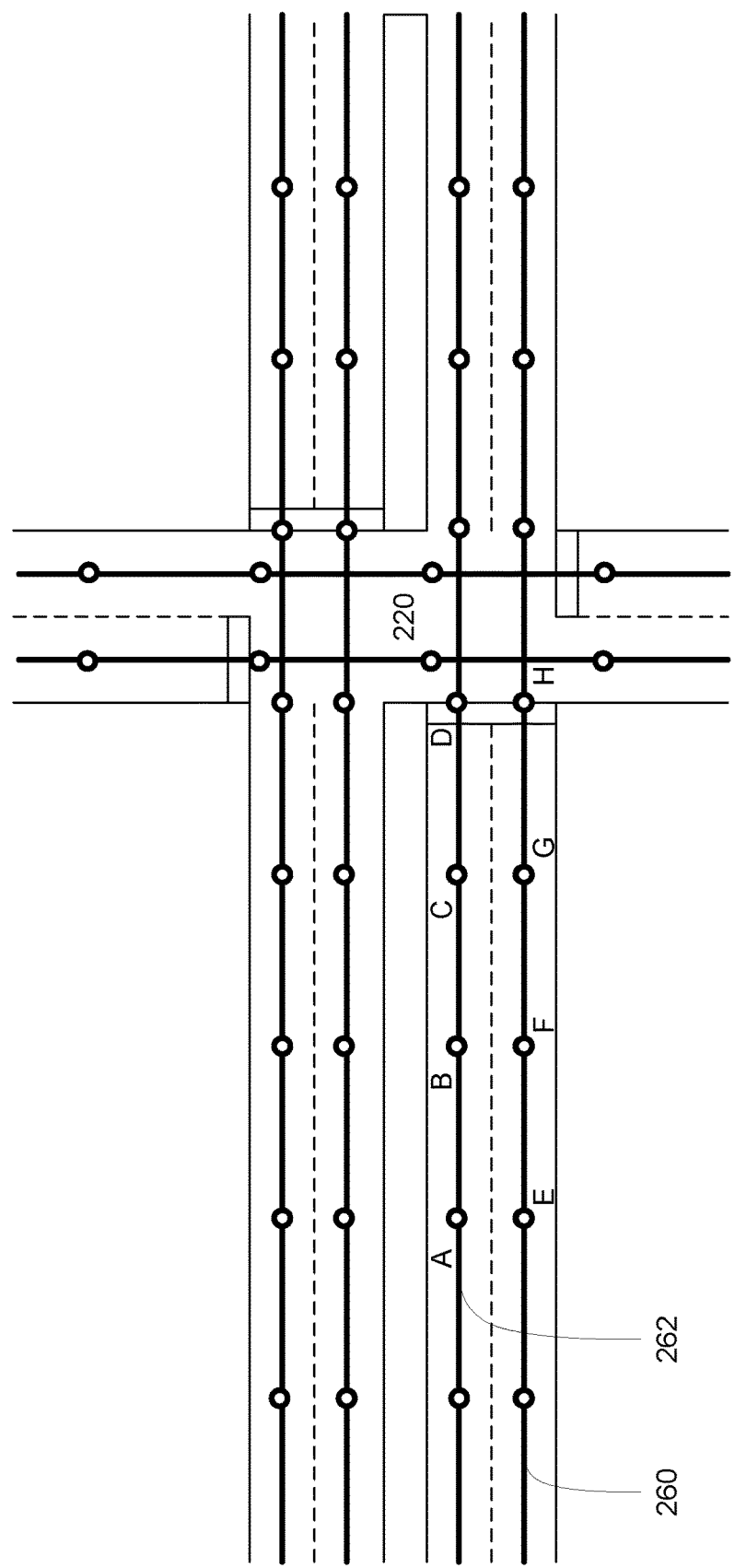

FIGS. 2A and 2B is an example of map information for a section of roadway including intersection 220. FIG. 2A depicts a portion of the map information that includes information identifying the shape, location, and other characteristics of lane markers or lane lines 210, 212, 214, defining lanes 230, 232, traffic signals 240, 242 (not depicted in FIG. 2A for clarity and simplicity), as well as stop lines 250, 252, 254. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

In addition to the feature information, the map information may include a series of road or lane segments. These lane segments may be connected to one another to provide rails or smooth curves representing the actual curves of a lane. For instance, FIG. 2A includes rails 260, 262, 264, 266, 268. To transition between rails, the computing devices may essentially draw additional curves as discussed further below and control the vehicle in order to follow these curves. In order to determine how to transition between two lanes, the computing devices may identify a plurality of nodes. Each node may essentially be "dropped" along a rail at regular intervals. The intervals may be defined in distance, such as every 5 meters or more or less, or based on duration of travel, for instance using a current or expected speed of the vehicle or a speed limit for the roadway. In this example, instead of dropping a node every 5 meters, a node may be dropped every 2 seconds or more or less. This has the effect of spacing out nodes further apart on higher speed roads, and spacing them closer together in slower areas such as 25 mile per hour zones or parking lots. FIG. 2B depicts a plurality of such nodes. Of course, though many nodes are depicted, only a few are referenced in FIG. 2B for clarity and simplicity. As can be seen, each of nodes A-D may represent a location along rail 262. Similarly, each of nodes E-H may represent a location along rail 260. Although not shown, each of these nodes may be associated with an identifier, for instance, a numeric value corresponding to a relative or actual location of the node or rail.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
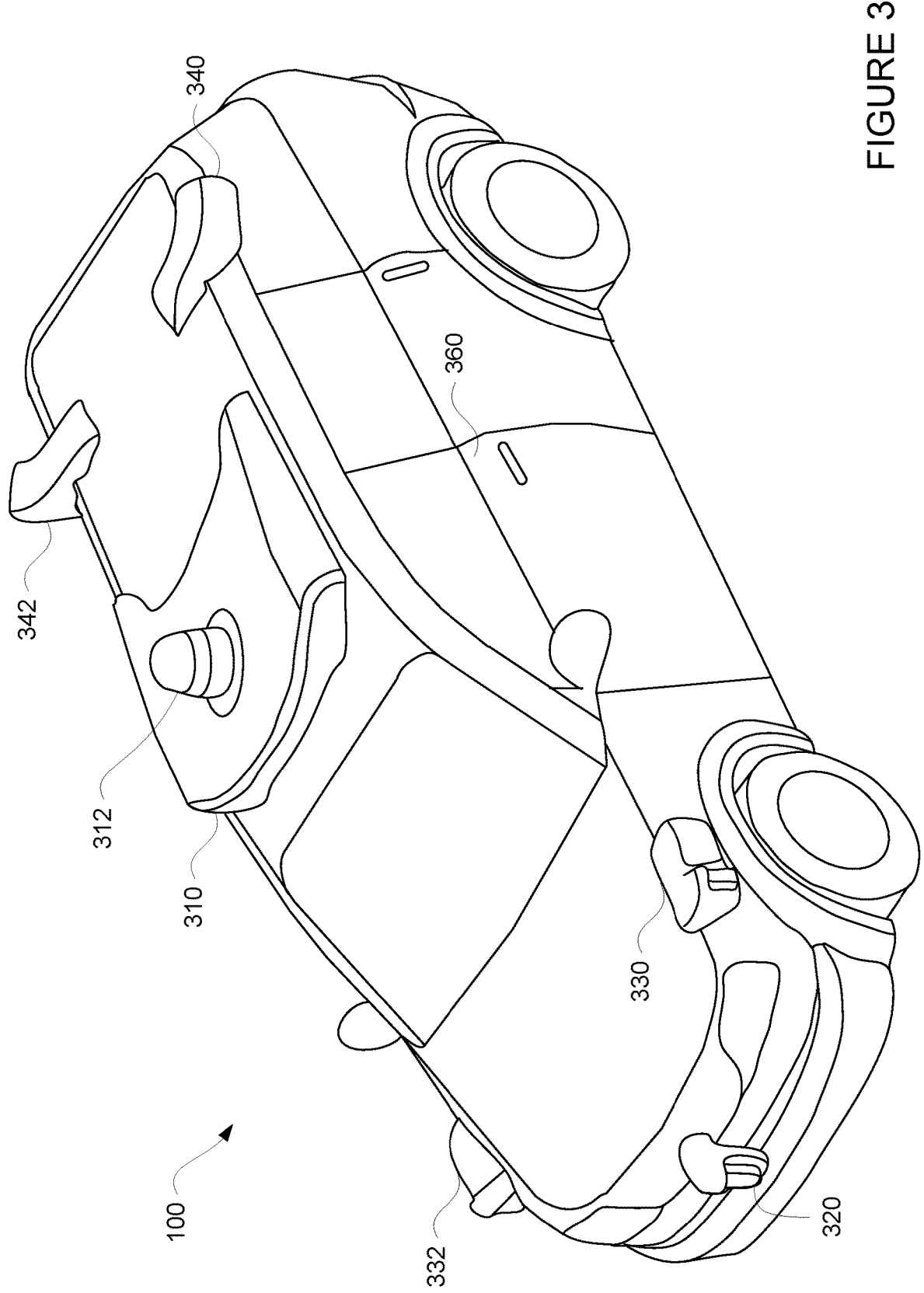
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or rooftop housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
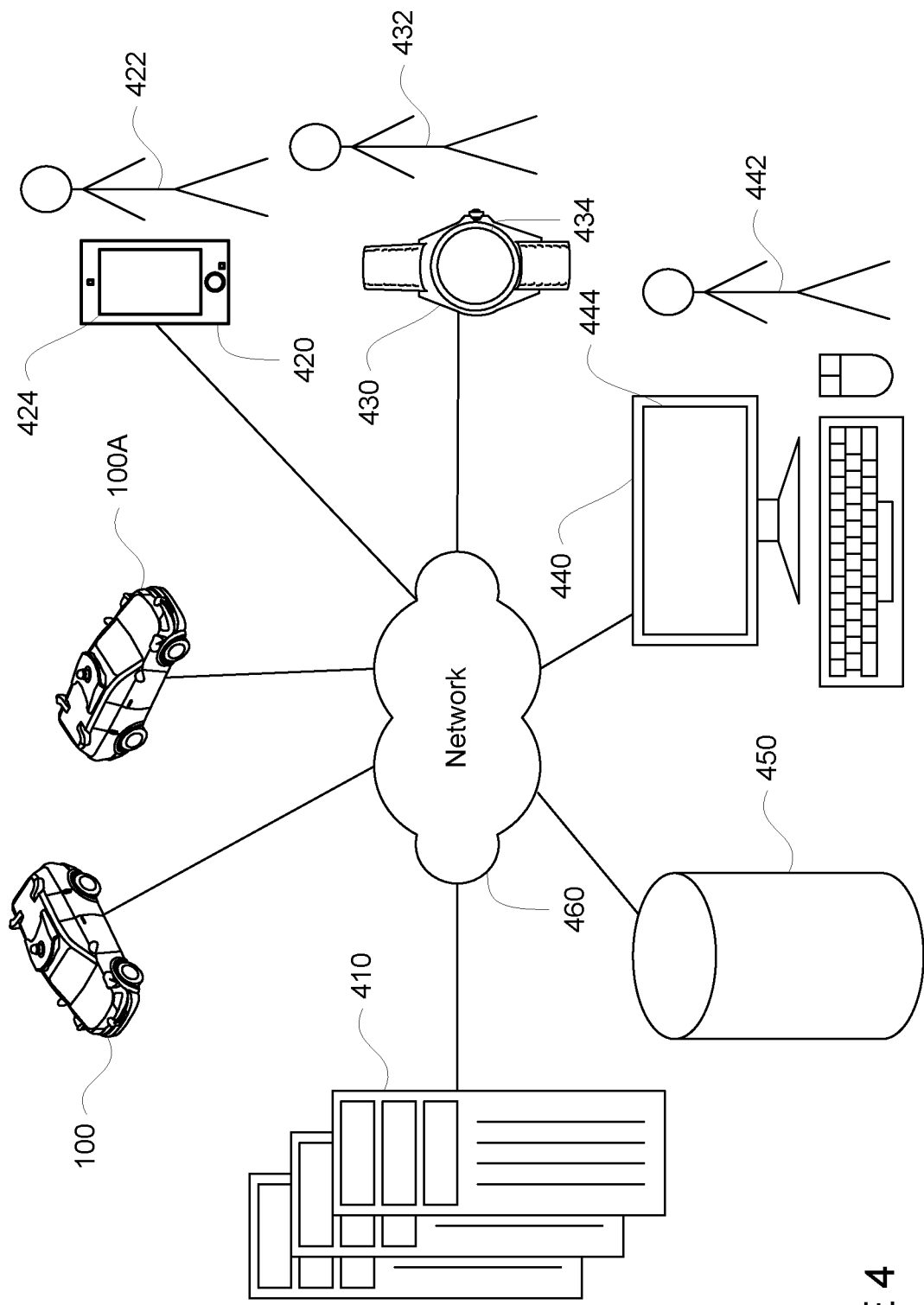
FIG. 4 is a pictorial diagram of an example system in accordance with an exemplary embodiment.
Figure 5:
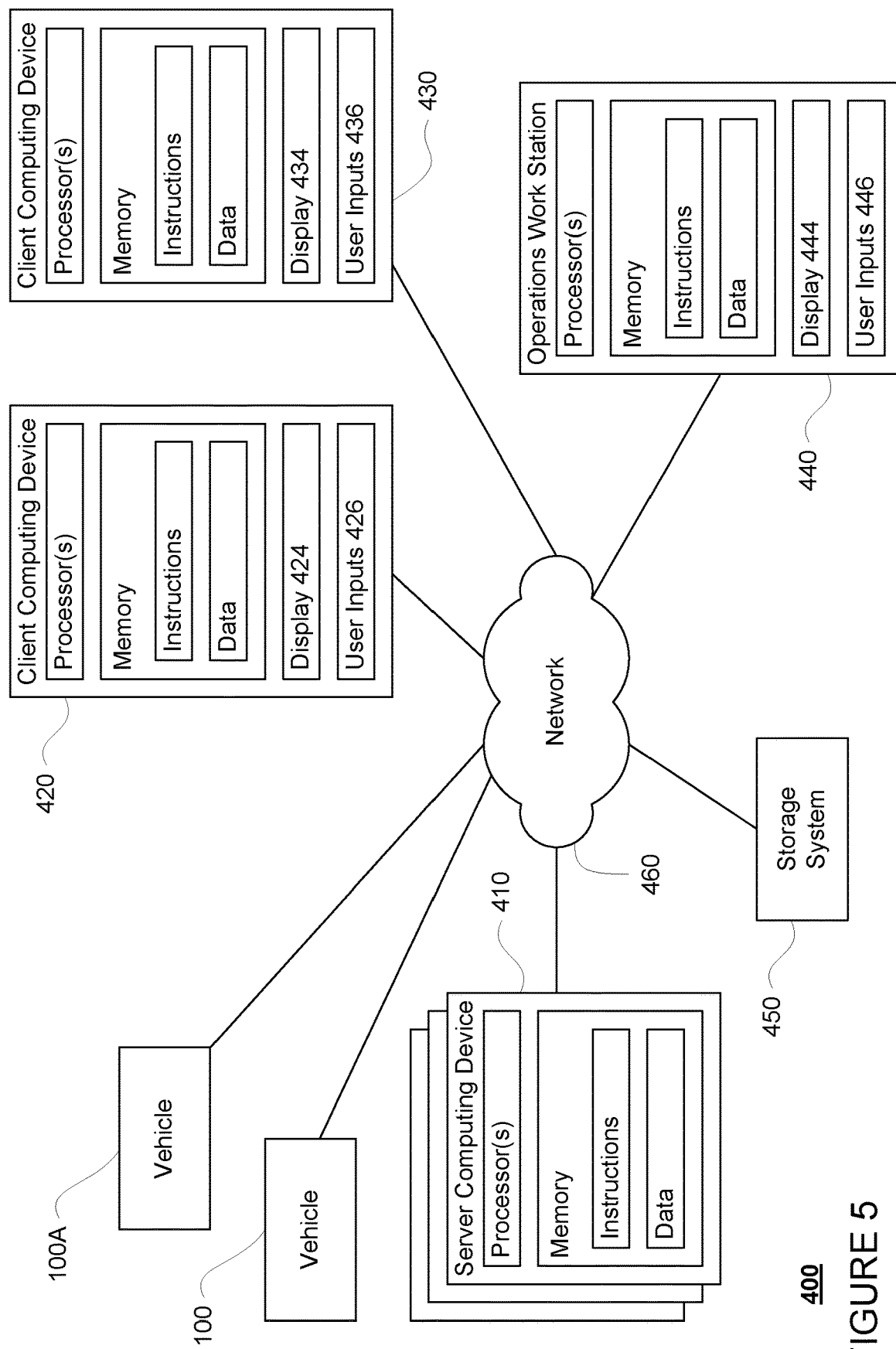
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge work station used by an administrator or operator of a depot to provide depot services for the vehicles of the fleet. Although only a concierge work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. In order to provide transportation services to users, the information of storage system 450 may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), one or more unique signals for the user as well as other user preference or settings data.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
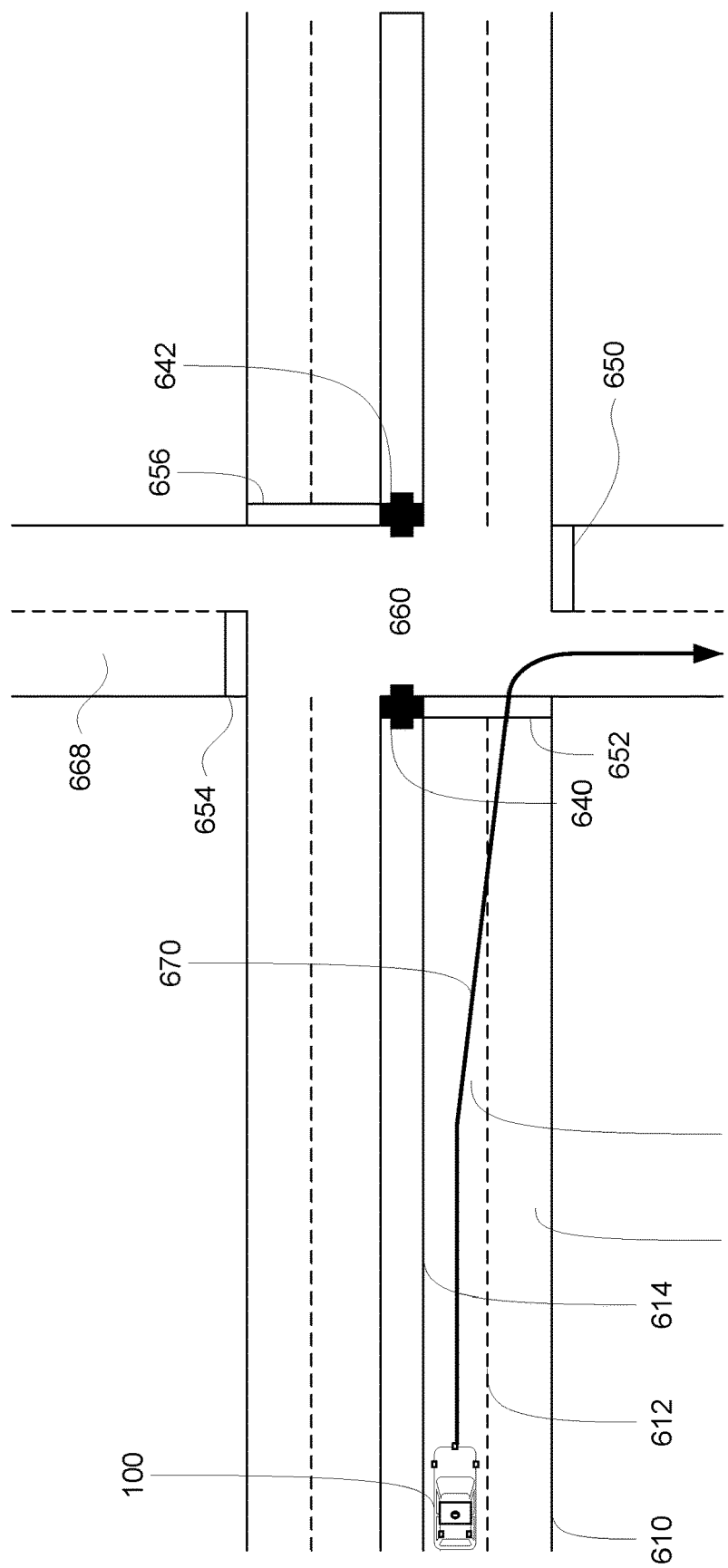
FIG. 6 is an example bird's eye view of a geographic area in accordance with aspects of the disclosure.

The vehicle's computing devices may control the vehicle in order to follow a route. FIG. 6 is an example view of vehicle 100 being maneuvered on a section of roadway corresponding to the section of roadway defined in the map information of FIGS. 2A and 2B. For instance, FIG. 6 depicts intersection 620 correspond to intersection 220. In addition the shape, location, and other characteristics of lane lines 610, 612, and 614 correspond to the shape, location and other characteristics of lane lines 210, 212, 214. Similarly, traffic signals 630, 632 correspond to traffic signals 230, 232, and stop lines 650, 652, 654 correspond to stop lines 250, 252, 254. By following and connecting rails together, the routing system 168 may generate a route between two locations. For instance, as shown in FIG. 6, vehicle 100 is currently driving in lane 632 following route 670. Route 670 requires vehicle 100 to change from lane 632 to lane 630 in order to make a right turn at intersection 624.

In order to determine when and where to make the lane change, the vehicle's computing devices may assess a cost of transitioning between pairs of nodes of the map information. In order to do so, the computing devices 110 may identify pairs of nodes from the map information. Each pair may include one node from the map information corresponding to a source lane or the current lane of the vehicle and one node from a target lane or rather the lane to which the vehicle needs to transition corresponding to a neighboring lane. In this example, a neighboring lane can mean, for instance, that a lane has a parallel direction of travel immediately adjacent to the left or right. In such cases, the computing devices 110 may pair nodes or rather, allow lane change opportunities between nodes in the source lane to nodes in the target lane so long as the lanes remain neighboring lanes (i.e. there are no forks or merges), and presuming they are not too long.

In some instances, once neighboring lanes are identified, the computing devices 110 may identify opportunities, or pairs of nodes, to lane change up to some fixed duration, by using speed limit information from the map in formation or a current or expected future speed of the vehicle. For example, from a node in a lane J, the computing devices 110 may allow lane change transitions into a neighboring lane K, or even to a neighboring lane for lane K, lane L, so long as any of those lane change opportunities are less than the fixed duration. This fixed duration may be as long as 40 seconds long or more of less. In this example, if the speed limit for lanes J, K and L were 30 mph, that would correspond to a maximum distance of approximately 530 meters. Also, to save on memory usage, the computing devices 110 may not identify all possible lane changes or all possible pairs of nodes up to 40 seconds. For example, the computing devices may choose to build a lane change opportunity that is 1 second, 2 seconds, 4 seconds, 10 seconds, 20 seconds, and 40 seconds long. This may cause the computing devices 110 to "skip over" many opportunities, but practically result in similar routing behavior.

However, in many cases, a lane's immediate neighboring lane can be travelling in the opposite direction. In this case, building a transition from a node to a node of an opposing neighboring lane would no longer represent a lane change, but rather a 180 degree change in heading, which could either be accomplished with a U turn or a multi-point turn. Such transitions may only be allowed on low-speed residential roads. In addition, not all transitions between nodes may be feasible, and thus may be ignored. For instance, the computing devices 110 may not pair nodes that would allow the car to go "backwards" during a lane change.

Figure 7:
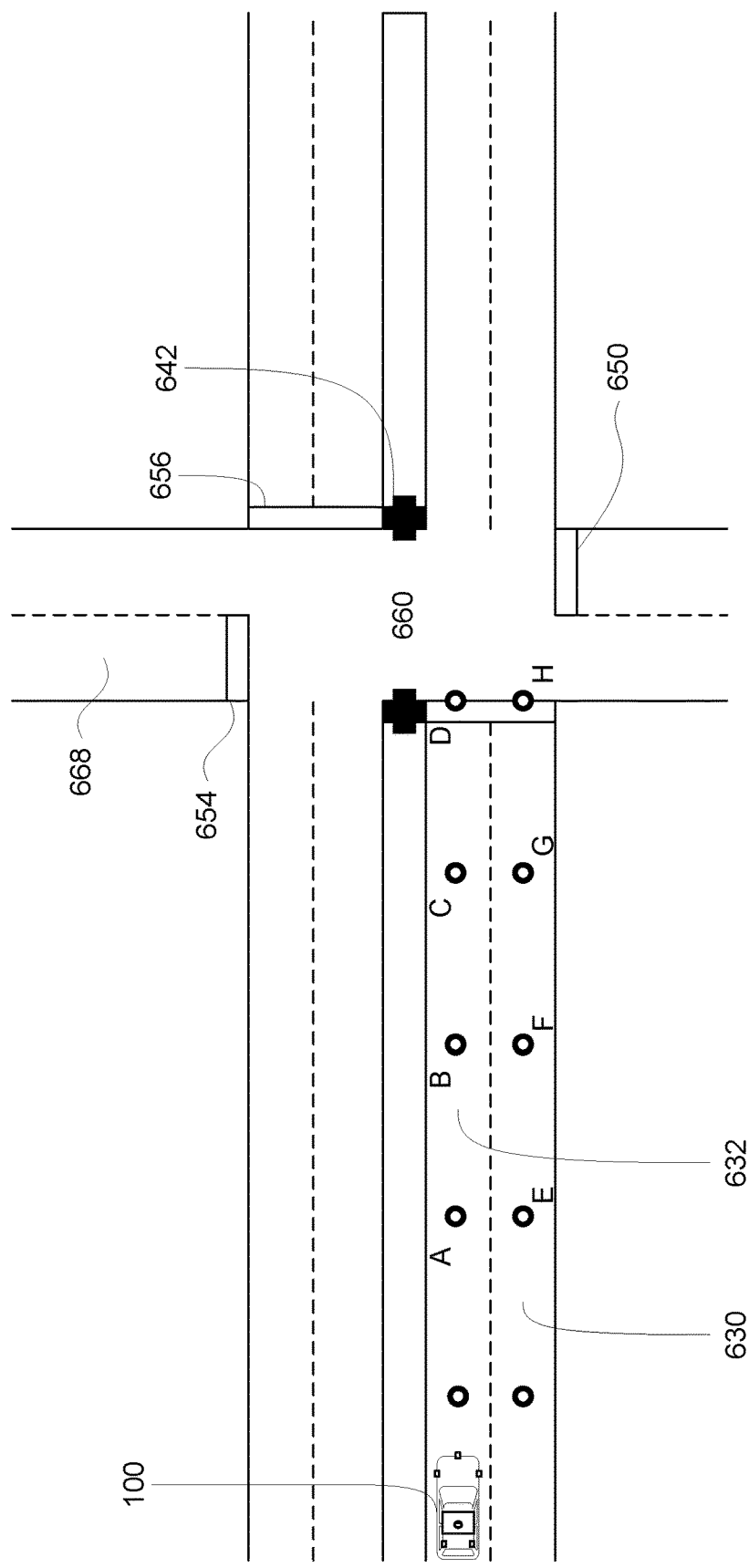
FIGS. 7-9 are examples views of the geographic area of FIG. 6 with data in accordance with aspects of the disclosure.
Figure 8:
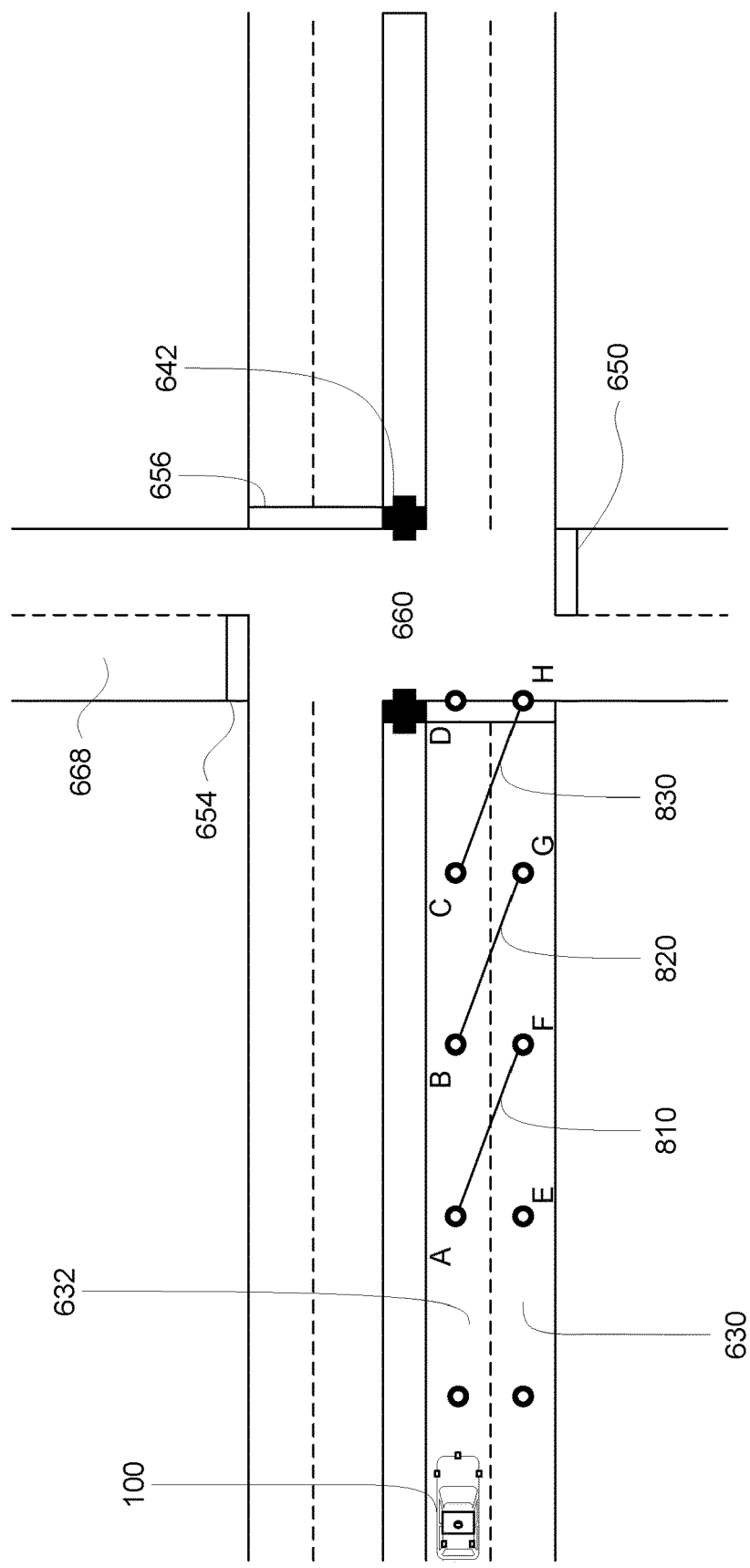

In the example of FIG. 6, lane 632 is the source lane and lane 630 is the target lane. The computing device 110 may pair nodes between vehicle 100's current location and intersection 620 in each of lanes 630 and 632. Such nodes may includer a plurality of nodes A-D corresponding to source lane 630 and a plurality of nodes E-H corresponding to target lane 632. FIG. 7 overlays the nodes A-H of the map information depicted in FIG. 2B between the vehicle's current location and intersection 620 with the example of FIG. 6 less the route 670. FIG. 8 depicts example pairs of nodes 810, 820, 830 between which vehicle 100 may transition in order to effect a lane change between source lane 632 and target lane 630. In other words, the computing devices 110 have identified three pairs of nodes which each include one node from the map information corresponding to lane 632 in which vehicle 100 is currently traveling and one node from the map information corresponding to lane 632. Thus, each of the pairs of nodes 810, 820, and 830 include one node corresponding to lane 632 and one node corresponding to lane 630.

As noted above each of these pairs of nodes, the computing devices 110 may assess a cost for the vehicle to transition between the nodes. For instance, the computing devices 110 may determine a cost value for vehicle 100 moving from node A to node F (pair of nodes 810), moving from node B to node G (pair of nodes 820), and moving from node C to node H (pair of nodes 820).

This cost assessment may include, for instance, determining a series of individual costs for different factors relating to transitioning between two nodes of each of the identified pairs of nodes, and using these individual costs to determine an overall cost for a transition between the two nodes. As an example, the factors may include a duration of the change, whether the change has been missed in the past, whether the vehicle will cross solid white lines, whether the vehicle will be initiating or making the change within an intersection, current traffic conditions in the area, the time of day when the change will occur (i.e. whether school is letting out and children will be present), whether the current lane changes to an exit shortly, how others are going to be lane changing or merging in the area, whether the change will put certain vehicles directly in the path of sun glare, etc. As an example of how other vehicles are going to be lane changing, if vehicle 100 is currently on the freeway in a lane that other vehicles are merging into, it would be better (i.e. should be easier and less costly) to have the vehicle change lanes immediately.

To determine the individual costs, each factor may be converted to an arbitrary value for a particular transition between two nodes. In this regard, each factor may have its own individual scale or weight which can be used to map that factor to a cost. These weights may include power law, exponential, piecewise, quadratic, linear, etc.

For instance, duration may be determined using piecewise linear function. An example range may go from 0 (a significant or maximum of time to make the transition) to 5000

(very little or no time to make the transition). This maximum amount of time may correspond to some value relating to a comfortable lane change experience for a passenger of the vehicle, such as 40 seconds or more or less. In some instances, the cost may never actually go all of the way to zero for One thing you might consider adding is that the cost doesn't actually go all the way down to 0, but rather may level off at some nonzero value like 100 or more or less. This may have the effect of minimizing a total number of lane changes for a given route. Without this, the computing devices 110 may actually cause the vehicle to make "too many" lane changes, or rather, causing the vehicle to jump back and forth from lane to lane.

Whether the vehicle crosses over solid white lines may be a binary (yes or no) value or determined using a piecewise linear function depending on how much of the area between the two nodes includes solid white line. In either of the aforementioned examples, an example range may go from 0 (no or no crossing solid white lines) to "2000" (yes or solid white lines between the entire length of the distance between the two nodes). As another example, whether the vehicle initiates a lane change between the two nodes within an intersection may be a binary (yes or no). An example value for no may be 0 and an example value for yes may be "2000".

The values for each of the individual costs may then be used to determine an overall cost for the transition between the two nodes using a cost function. In one example, the cost function may be a linear function where the values may be summed together to generate the overall cost for that transition or lane change. Alternatively, the cost function may be a weighted linear sum where the values may be weighted and summed together, or normalized and summed together to generate the overall costs. In addition, in some instances, cost function or the sum of the values may be normalized to determine the overall costs. n many instances, the longest lane changes (i.e. those having the longest durations) may have the lowest costs in order to provide the vehicle with as much time as possible to execute the lane change.

The computing devices may then iterate through pairs of nodes corresponding to different possible transitions or lane changes and identify overall costs for each pair of nodes using the cost functions as discussed above. In this regard, the computing device 110 may first determine an overall cost for pair of nodes 810, thereafter determine an overall cost for pair of nodes 820, and finally determine an overall cost for pair of nodes 830. For instance, computing devices may determine an overall cost for pair of nodes 810 equal to "2500", an overall cost for pair of nodes 820 equal to "2000".

After iterating through pairs of nodes corresponding to different possible transitions, the computing devices may select a particular pair of nodes. For instance, a pair of nodes having the lowest overall cost of all of the pairs of nodes may be selected. In this regard, pair of nodes 820, corresponding to nodes B and G may be selected as having the lowest overall cost.

Figure 9:
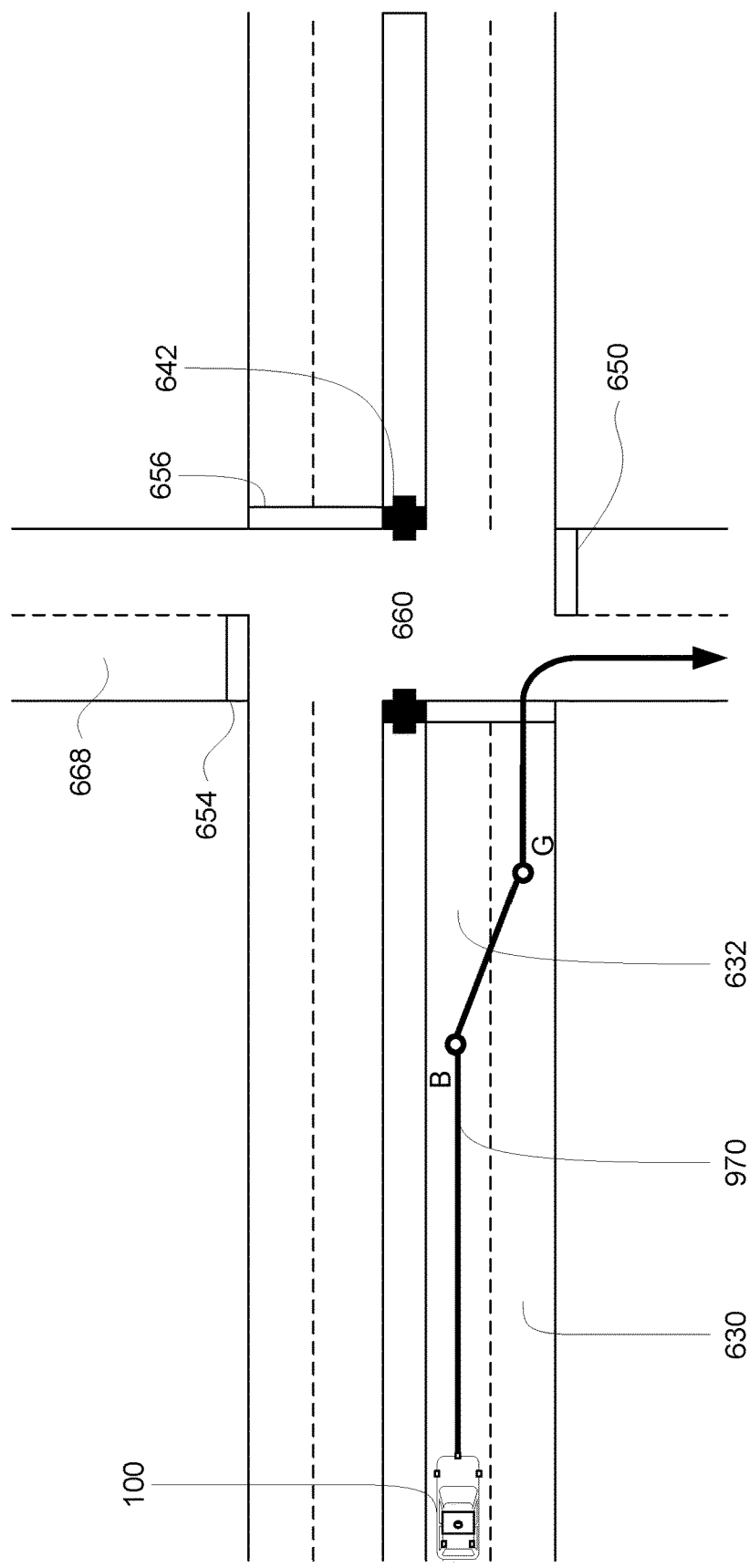

This selected pair may then be used by the vehicle's computing devices to determine how to maneuverer the vehicle in order to change lanes. In this regard, the computing devices may use these nodes to generate one or more paths or trajectories that define the vehicle's future locations as passing from one node of the selected pair of nodes to the other node of the pair or between the two nodes of the selected pair of nodes. For instance, FIG. 9 depicts a trajectory 970 which includes vehicle passing between nodes B and G in order to continue to follow route 670 and make a right turn at intersection 624. The vehicle may then be controlled to follow the one or more trajectories in order to complete the lane change.

In addition, if the vehicle is unable to make the change using the selected pair of nodes, a cost for changing lanes between the selected pair of nodes can be increased. This increase can then be stored for later use, for example, in the map. For instance, increasing the number of times the vehicle has missed a lane change between a selected pair of nodes in the past will increase this individual cost between those same nodes in the future, and thus making the overall cost of transitioning between those nodes greater as well. This allows the vehicle to avoid falling into an infinite loop of not being able to make a particular lane change by decreasing the likelihood that the vehicle will select that lane change (i.e. those two nodes) for a lane change in the area in the future. This can be especially relevant in the case of the vehicle attempting to make a lane change in a circle where the vehicle may get stuck in an infinite loop (i.e. continue going around the circle without being able to change lanes) if the vehicle cannot make a lane change between two nodes having the lowest overall cost when the overall costs for lane changes of the loop are constant.

In addition, in the case where the vehicle is unable to make a lane change for the selected pair of nodes, and that lane change is the only way to reach a destination, the computing devices 110 may determine that the destination is not actually reachable. In such cases, the computing devices 110 may pullover as soon as possible, select a new destination, request assistance or further instructions from the server computing devices 410, the concierge work station 440, or a client computing device of a passenger, and so on.

Figure 10:
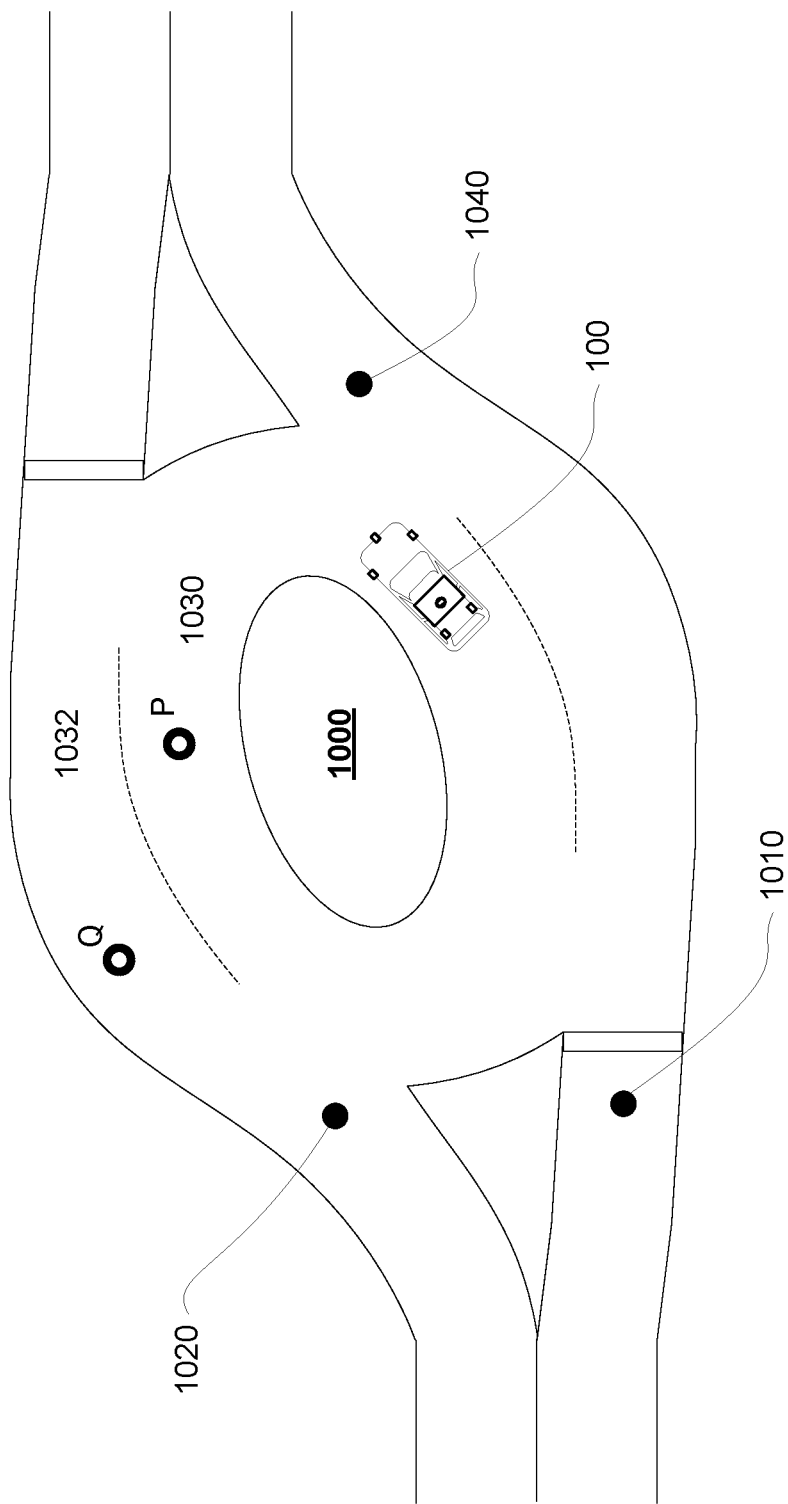
FIG. 10 is an example bird's eye view of a traffic circle in accordance with aspects of the disclosure.

For instance, FIG. 10 is an example of a traffic circle 1000. In this example, vehicle 100 may have entered the traffic circle at point (or node) 1010 and may need to exit the traffic circle at point (or node) 1020 in order to follow a route (not shown) that leads the vehicle around the traffic circle 1000 between point 1010 and point 1010. Currently vehicle 100 is traveling in an interior lane 1030, but must change to the exterior lane 1032 in order to exit the traffic circle 1000 at point 1010. Computing devices 110 may have determined that the pair of nodes having the lowest overall cost to transition between interior lane 1030 and exterior lane 1032 is nodes P and Q. However, if for some reason the vehicle 100 is unable to complete the transition between nodes P and Q, for instance, because there is not enough time or distance to complete the transition or because other vehicles or objects prevents vehicle 100 from making the transition, the vehicle 100 may loop around circle 1000 in interior lane 1030. In certain circumstances, this looping may even become indefinite. Thus to avoid this, by increasing the overall cost of transitioning between nodes P and Q, the computing devices 110 may identify another pair of nodes for the lane change, and therefore may be able to effect a lane change at another location between a different pair of nodes and be able to leave the traffic circle 1000 either at point 1020 or possibly point (or node) 1040 and reroute to wherever the vehicle's final destination is location.

These cost increases can be limited in time. For instance, a cost increase may be valid only for this one trip, only during business hours, only on weekends, only for the next 20 minutes, etc. As a practical example, a stationary vehicle which is obstructing a particular node in a lane, such as a delivery or garbage truck, may prevent a vehicle from performing a lane change. However, these vehicles would be expected to move shortly, so a brief, such as 20 minutes or more or less, time limitation on the cost increase may be appropriate. Similarly, if the vehicle is unable to make the lane change because of traffic, a slightly longer or more specific time limitation may be used, such as only for the next hour or during the same hour on the same day of the week. In the circle example above, where the difficulty is likely to persist, there may be no time limit. This may allow the vehicle to remove or reduce the costs of some lane changes over time.

The vehicle's computing devices may also share increases or decreases in individual costs for pairs of nodes with other vehicles. For instance, this information may be broadcast to vehicles nearby, such as vehicle 100A via network or within a predetermined distance (such as 1 mile or more or less), broadcast all vehicles in a fleet of vehicles, or sent to a dispatching server to relay to all or a portion of other vehicles which receive information from the dispatching service.

In some instances, the individual costs may be adjusted or the scales changed for certain circumstances. For example, the individual cost for duration of a lane change between two nodes may increase or decrease automatically depending upon traffic or the time of day. Again, this information may be stored in the map information.

In addition to considering the circumstances of a single lane change using a locally optimized solution, the computing devices may actually consider the impact of multiple lane changes at once. For example, if vehicle 100 needs to make multiple lane changes in a row, from lane X to lane Y to lane Z, there may be many opportunities to go from X to Y and from Y to Z. In some cases, selecting the best solution for X to Y may limit or prevent lane change opportunities from Y to Z. In this regard, the set of nodes and transitions forms a routing network. The computing devices 110 may therefore choose a globally optimized path through the network. That is, when considering the case of changing from X to Y to Z, the computing devices may select the lane change opportunities which minimizes a total cost to go from X to Y and to go from Y to Z. Neither of these may be the respective local optimal solution for these lane changes, but the overall total cost may be minimized.

Figure 11:
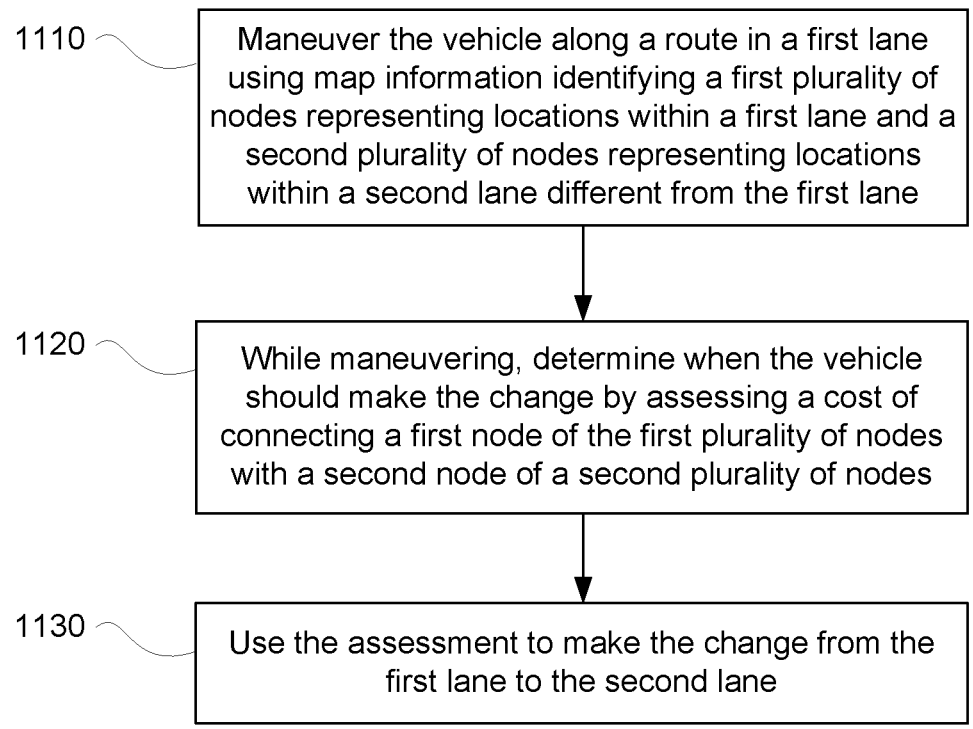
FIG. 11 is an example flow diagram in accordance with aspects of the disclosure.

FIG. 11 includes an example flow diagram 1100 of some of the examples for routing an autonomous vehicle, such as vehicle 100, which may be performed by one or more processors such as processors 110. For instance, at block 1110, the vehicle is maneuvered along a route in a first lane using map information identifying a first plurality of nodes representing locations within the first lane and a second plurality of nodes representing locations within a second lane different from the first lane. At block 1120, while maneuvering, when the vehicle should make the change is determined by assessing a cost of connecting a first node of the first plurality of nodes with a second node of a second plurality of nodes. At block 1130, the assessment is used to make the lane change from the first lane to the second lane.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of routing an autonomous vehicle, the method comprising:
maneuvering, by one or more processors, the vehicle along a route in a first lane using map information identifying a first plurality of nodes representing locations within a first lane and a second plurality of nodes representing locations within a second lane different from the first lane;
identifying, by the one or more processors, a plurality of pairs of the nodes corresponding to different possible transitions between the first lane and the second lane, each pair of nodes including a first node of the first plurality of nodes corresponding to the first lane and a second node of the second plurality of nodes corresponding to the second lane;
assessing, by the one or more processors, a cost for each pair of nodes to perform a lane change;
determining, by the one or more processors, whether the vehicle is able to perform the lane change from the first lane to the second lane to follow the route using the assessed cost; and
when the vehicle is determined not to be able to perform the lane change:
increasing, by the one or more processors, the assessed cost of the first pair of nodes;
selecting, by the one or more processors, a second pair of nodes from the plurality of pairs of the nodes to perform the lane change from the first lane to the second lane; and
maneuvering, by the one or more processors, the vehicle to perform the lane change from the first lane to the second lane based on the second pair of nodes.

2. The method of claim 1, wherein the assessing a cost includes applying a cost function.

3. The method of claim 2, wherein the cost function is based on a period of time during which one of the locations represented by the first node changes to one of the locations represented by the second node.

4. The method of claim 2, wherein the cost function is based on current traffic conditions.

5. The method of claim 2, wherein the cost function is based on whether a lane change between a selected pair of nodes of the first and second pluralities of nodes has been missed in the past.

6. The method of claim 2, wherein the cost function is based on whether the vehicle will cross a solid white line.

7. The method of claim 2, wherein the cost function is based on whether the vehicle will be initiating or making the lane change within an intersection.

8. The method of claim 2, wherein the cost function is based on a time of day the lane change will occur.

9. The method of claim 1, further comprising, iterating through pairs of nodes of the first and second pluralities of nodes to determine where to perform the lane change.

10. A system for routing an autonomous vehicle, the system comprising one or more processors configured to:
maneuver the vehicle along a route in a first lane using map information identifying a first plurality of nodes representing locations within a first lane and a second plurality of nodes representing locations within a second lane different from the first lane;
identify a plurality of pairs of the nodes corresponding to different possible transitions between the first lane and the second lane, each pair of nodes including a first node of the first plurality of nodes corresponding to the first lane and a second node of the second plurality of nodes corresponding to the second lane;
assess a cost for each pair of nodes to perform a lane change;
determine whether the vehicle is able to perform the lane change from the first lane to the second lane to follow the route using the assessed cost; and
when the vehicle is determined not to be able to perform the lane change:
increase the assessed cost of the first pair of nodes;
select a second pair of nodes from the plurality of pairs of the nodes to perform the lane change from the first lane to the second lane; and
maneuver the vehicle to perform the lane change from the first lane to the second lane based on the second pair of nodes.

11. The system of claim 10, wherein the assessing a cost includes applying a cost function.

12. The system of claim 11, wherein the cost function is based on a period of time during which one of the locations represented by the first node changes to one of the locations represented by the second node.

13. The system of claim 11, wherein the cost function is based on current traffic conditions.

14. The system of claim 11, wherein the cost function is based on whether a lane change between a selected pair of nodes of the first and second pluralities of nodes has been missed in the past.

15. The system of claim 11, wherein the cost function is based on whether the vehicle will cross a solid white line.

16. The system of claim 14, wherein the one or more processors are further configured to iterate through pairs of nodes of the first and second pluralities of nodes to determine where to perform the lane change.

17. The system of claim 14, further comprising memory storing the map information.

18. The system of claim 14, further comprising the vehicle.

19. The method of claim 1, further comprising:
broadcasting, by the one or more processors, information indicating the increased assessed cost of the first pair of nodes to one or more other vehicles of a fleet of vehicles the autonomous vehicle belongs to.

20. The method of claim 1, further comprising:
broadcasting, by the one or more processors, information indicating the increased assessed cost of the first pair of nodes to a dispatching server to relay to one or more other vehicles of a fleet of vehicles the autonomous vehicle belongs to.

21. The method of claim 1, further comprising:
determining, by the one or more processors, a time when the vehicle should perform a lane change from the first lane to the second lane to follow the route, wherein the vehicle is determined not able to perform the lane change when there is not enough time for the vehicle to perform the lane change by the determined time.

22. The system of claim 10, wherein the one or more processors are further configured to determine a time when the vehicle should perform a lane change from the first lane to the second lane to follow the route, and determine that the vehicle is not able to perform the lane change when there is not enough time for the vehicle to perform the lane change by the determined time.

* * * * *

UNITED STATES PATENT AND TRADEMARK OFFICE
CERTIFICATE OF CORRECTION

PATENT NO. : 11,360,475 B2
APPLICATION NO. : 15/831678
DATED : June 14, 2022
INVENTOR(S) : Abrams et al.

It is certified that error appears in the above-identified patent and that said Letters Patent is hereby corrected as shown below:

In the Claims

Claim 1, Column 14, Line 25:
Now reads: "assessed cost"; should read -- assessed costs --

Claim 1, Column 14, Line 29:
Now reads: "the first pair of nodes"; should read -- a first pair of nodes --

Claim 10, Column 15, Line 9:
Now reads: "assessed cost"; should read -- assessed costs --

Claim 10, Column 15, Line 12:
Now reads: "the first pair of nodes"; should read -- a first pair of nodes --

Signed and Sealed this
Sixteenth Day of August, 2022

Katherine Kelly Vidal
*Director of the United States Patent and Trademark Office*